(12) United States Patent
Morow et al.

(10) Patent No.: US 8,029,894 B2
(45) Date of Patent: *Oct. 4, 2011

(54) MULTI-LAYER COMPOSITES FORMED FROM COMPOSITIONS HAVING IMPROVED ADHESION

(75) Inventors: Karen A. Morow, Verona, PA (US); Jane N. Valenta, Pittsburgh, PA (US); Shanti Swarup, Allison Park, PA (US); Lawrence G. Anderson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/465,624

(22) Filed: Aug. 18, 2006

(65) Prior Publication Data

US 2011/0165418 A1 Jul. 7, 2011

(51) Int. Cl.
*B32B 7/04* (2006.01)
*B32B 27/08* (2006.01)
*B32B 27/18* (2006.01)
*B32B 27/26* (2006.01)
*B32B 27/36* (2006.01)

(52) U.S. Cl. ........ 428/354; 428/343; 428/457; 428/458; 428/461; 428/480; 428/482; 428/483; 428/500; 524/183; 524/184; 524/599; 524/601; 524/603; 524/604; 524/701; 524/394; 528/282

(58) Field of Classification Search ................ None
See application file for complete search history.

(56) References Cited

U.S. PATENT DOCUMENTS

| 3,776,782 | A  | * | 12/1973 | Kiefer et al. | 428/458 |
| 6,387,519 | B1 |   | 5/2002  | Anderson et al. | 428/447 |
| 6,592,998 | B2 | * | 7/2003  | Anderson et al. | 428/447 |
| 6,592,999 | B1 | * | 7/2003  | Anderson et al. | 428/447 |
| 6,610,777 | B1 |   | 8/2003  | Anderson et al. | 524/588 |
| 6,623,791 | B2 | * | 9/2003  | Sadvary et al. | 427/140 |
| 6,657,001 | B1 |   | 12/2003 | Anderson et al. | 524/588 |
| 7,897,261 | B2 | * | 3/2011  | Burgman et al. | 428/523 |
| 2003/0232222 | A1 | * | 12/2003 | Anderson et al. | 428/704 |
| 2005/0042463 | A1 | * | 2/2005  | Anderson et al. | 428/447 |

FOREIGN PATENT DOCUMENTS

| WO | WO 03/011583 A2 | 2/2003 |
| WO | WO 03/011986 A  | 2/2003 |

* cited by examiner

*Primary Examiner* — Vivian Chen
(74) *Attorney, Agent, or Firm* — Steven W. Hays; Diane R. Meyers

(57) ABSTRACT

Thermosetting compositions comprising an adhesion-promoting agent are disclosed. The adhesion-promoting agent is derived from boric acid or an equivalent and an ester having two or more functional groups that are derived at least in part from a 1,3-polyol.

31 Claims, No Drawings

US 8,029,894 B2

MULTI-LAYER COMPOSITES FORMED FROM COMPOSITIONS HAVING IMPROVED ADHESION

FIELD OF THE INVENTION

The present invention relates to multi-layer composites of two or more polymeric layers, at least one of which is formed from a thermosetting composition. The composite comprising at least a first polymeric layer formed on a substrate and a second polymeric formed over at least a portion of the first polymeric layer. The present invention also relates to thermosetting coating compositions used to form the multi-layer composites and which improve the interlayer adhesion of the multi-layer composites.

BACKGROUND OF THE INVENTION

Color-plus-clear coating systems involving the application of a colored or pigmented basecoat to a substrate followed by application of a transparent or clearcoat over the basecoat have become increasingly popular as original finishes for a number of consumer products including, for example, automotive vehicles. The color-plus-clear coating systems have outstanding appearance properties such as gloss and distinctness of image, due in large part to the clearcoat. Such color-plus-clear coating systems have become popular for use with automotive vehicles, aerospace applications, floor coverings such as ceramic tiles and wood flooring, packaging coatings and the like.

A typical automotive coating system can include the sequential application of an electrodeposition primer, a primer-surfacer, a color providing base coat, and a transparent topcoat. Also, adhesive coatings or layers, for example, windshield adhesives, trim and molding adhesives and structural adhesives are sometimes applied to the cured topcoats. In fabricating these multi-layer composite coatings, it is necessary that the various layers have acceptable interlayer adhesion.

On commercial automobile coating lines during application of the coating system, certain portions of the line can experience occasional process problems, for example, where the color coat applicator malfunctions, or curing oven faults where temperatures are out of specification. In these instances where the clear coat application system is malfunctioning, some automobile manufacturers may elect to fully cure the applied color coat and then reapply the color coat over the fully cured color coat prior to application of the clearcoat. In such situations, the fully cured color coat can have poor intercoat adhesion with the subsequently applied color coat, even though the compositions may be the same.

Further, during the assembly process, the applied color-plus-clear coating can include surface defects in the clear coat surface that requires repair. Some automobile manufacturers may elect to remove the defect and recoat the repair area with the same clear coat composition. In this instance, the cured clear coat must have excellent intercoat adhesion to the subsequently applied clear coat. It is known, however, that some clear coats when cured have poor intercoat adhesion with the subsequently applied repair clear coat.

Also, windshields and other items such as trim moldings typically are affixed to the body of a vehicle with an adhesive material, typically a moisture-cured material containing isocyanate group-containing polymers. Motor Vehicle Safety Standards (MVSS) require that these adhesives have complete adhesion to both the windshield and the coated substrate to which they are applied. These adhesive products adhere well to many cured topcoating compositions used to coat vehicles such as automobiles. It is known, however, that these adhesive materials often do not completely adhere to some topcoats, for example, those formed from coating compositions based on carbamate and/or urea containing polymers. This necessitates the application of a primer coating to the cured carbamate and/or urea-based top coatings prior to application of the windshield adhesive to ensure compliance with the aforementioned Motor Vehicle Safety Standards. Use of such primer coatings has proven to be effective, but primer coating application adds an additional and expensive step to the windshield and/or trim installation processes.

In view of the foregoing, there is a need in the coating industry for coating compositions that have improved intercoat or interlayer adhesion properties.

It has now been found that certain adhesion-promoting agents that have surface active properties such that the solubility parameter of the coating composition containing the adhesion-promoting agent is sufficiently different from that of an analogous coating composition which does not contain the adhesion-promoting agent; the adhesion-promoting agent partitions to the surface region of the resultant coating. This can result in a concentration of the adhesion-promoting agent at the surface region which is greater than the concentration in the interior or bulk region of the coating layer. This partitioning effect of the adhesion-promoting agent can significantly increase its effect in promoting the adhesion of the coating layer that contains the adhesion-promoting agent to a subsequently applied coating layer, as well as to the substrate to which it is applied.

SUMMARY OF THE INVENTION

The present invention is directed to a multi-layer composite of two or more polymeric layers at least one of which is formed from a thermosetting composition. The composite comprises at least a first polymeric layer formed on a substrate and a second polymeric layer over at least a portion of the first polymeric layer, wherein in the absence of a boron-containing compound, the first polymeric layer and the second polymeric layer have poor interlayer adhesion. The improvement comprises the inclusion of an adhesion-promoting agent in one or both of the first and second polymeric layers in an amount sufficient to improve the interlayer adhesion of the first polymeric layer and the second polymeric layer. The adhesion-promoting agent is derived from:
(i) boric acid or an equivalent thereof,
(ii) an ester having two or more terminal hydroxyl groups that are derived at least in part from a 1,3-polyol, the equivalent ratio of boric acid or equivalent thereof to hydroxyl being greater than 0.1:1 and the equivalent ratio of 1,3-polyol to acid being greater than 2:1.

The present invention is also directed to a thermosetting composition comprising (A) a film-forming polymer having reactive functional groups; (B) a curing agent having functional groups that are reactive with the functional groups of the polymer (A); and (C) an adhesion-promoting agent as described above.

DETAILED DESCRIPTION OF THE PREFERRED EMBODIMENTS

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, in the specification and in the claims, by "boric acid equivalents" is meant any of the numerous boron-containing compounds that can hydrolyze in aqueous media to form boric acid. Specific, but non-limiting examples of boric acid equivalents include boron oxides, for example, $B_2O_3$; boric acid esters such as those obtained by the reaction of boric acid with an alcohol or phenol, for example, trimethyl borate, triethyl borate and triphenyl borate.

Additional non-limiting examples of boric acid equivalents may include, other amino-containing borates and tertiary amine salts of boric acid. Such boron-containing compounds include, but are not limited to, 2-(beta-dimethylaminoisopropoxy)-4,5-dimethyl-1,3,2-dioxaborolane and 2-(beta-diethylaminoethoxy)-4,4,6-trimethyl-1,3,2-dioxaborinane.

Boric acid equivalents can also include metal salts of boric acid (i.e., metal borates) provided that such metal borates can readily dissociate in aqueous media to form boric acid. Suitable examples of metal borates include, for example, calcium borate, potassium borates such as potassium metaborate and potassium tetraborate.

The ester for use in the present invention is a material containing at least one ester linkage and can be a monoester or a polyester having two or more terminal hydroxyl groups that are derived from reacting a mono or polyacid with a polyol, at least a portion of which is a 1,3-polyol. Among the monocarboxylic acids that can be used are those containing at least six contiguous carbon atoms, or from 7 to 18 contiguous carbon atoms.

Non-limiting examples of suitable monocarboxylic acids include heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof.

In a non-limiting embodiment, the ester-containing material is a polyester. Polyesters can be prepared in a known manner by condensation of polyhydric alcohols and polycarboxylic acids. Suitable polycarboxylic acids include those containing from 4 to 40 contiguous carbon atoms and from 2 to 3 carboxylic acid groups. Non-limiting examples include succinic acid, adipic acid, azelaic acid, sebacic acid, maleic acid, fumaric acid, cyclohexane dicarboxylic acid, phthalic acid, tetrahydrophthalic acid, hexahydrophthalic acid and trimellitic acid, and fatty carboxylic acids such as those available as EMPOL 1008, EMPOL 1010 and PRIPOL 1013. In addition to the polycarboxylic acids mentioned above, functional equivalents of the acids such as anhydrides where they exist or lower alkyl esters of the acids such as methyl esters can be used.

The polyols that may be employed in the present invention may include alkylene polyols containing from 2-16 carbon atoms, such as but not limited to ethylene glycol, diethylene glycol, neopentyl glycol, 1,4-butanediol and 1,6-hexanediol. At least a portion of the polyol is a 1,3-polyol such as trimethylolpropane, pentaerythritol, ditrimethylolpropane and dipentaerythritol.

The esterification reaction is carried out in accordance with techniques that are well known to those skilled in the art of polymer chemistry and a detailed discussion is not believed to be necessary. Generally, the reaction can be conducted by combining the ingredients and heating to a temperature of about 160° C. to about 230° C. Further details of the esterification process are disclosed in U.S. Pat. No. 5,468,802 at column 3, lines 4-20 and 39-45.

The ester and boric acid or its equivalent can be reacted under condensation reaction conditions well known in the art. For example, mixing boric acid or a boric acid equivalent with a hydroxyl functional polyester and removing water by distillation either directly or in combination with a solvent. Other methods for preparing boric acid esters can be found in Kirk-Othmer "Encyclopedia of Chemical Technology", 4th edition, Vol 4, p 416; John Wiley and sons; 1992.

Also, it should be understood that the boron-ester can be formed in situ. That is, the composition from which one or both of the first and second polymeric layers is formed can comprise boric acid and/or its equivalent and the ester-containing material, such as a hydroxyl functional polyester, as separate hydroxyl functional groups, as separate components. The adhesion promoter can then be formed by forming the reaction product within the composition at ambient temperature or as the composition undergoes a curing reaction at elevated temperatures. In this instance, the composition can comprise the reaction product and the boric acid or its equivalent and the ester-containing material as separate components.

The amounts of boric acid or its equivalent and the hydroxyl functional ester that are used in the adhesion-promoting agent may vary. In alternate non-limiting embodiments, the amount of boric acid or its equivalent thereof to hydroxyl, on an equivalent basis, may be greater than 0.1:1, or at least 0.2:1, or from 0.3 to 1.25:1. Equivalent ratios less than 0.2:1 can result in poor intercoat adhesion. Ratios greater than 1.25:1 can be used but no added benefits have been observed at such higher ratios.

The relative amounts of polyol and acid that are used to form the ester may vary. In a non-limiting embodiment, the amount of polyol and acid can be on a hydroxyl to acid equivalent ratio basis greater than 1:1. In further embodiment, the equivalent ratio of 1,3-polyol to acid can be greater than 2:1, or at least 3:1. If the equivalent ratio of 1,3-polyol to acid is 2:1 or less, intercoat adhesion can be poor.

Although not intending to be bound by any theory, it is believed the polyester is a surface active agent causing the boron to migrate to the surface regions of the polymeric layer in which the adhesion promoter is contained and where the adhesion promoter is most effective in promoting interlayer adhesion. It is further believed that the use of boric acid without the polyester is not as effective as an adhesion promoter.

In an embodiment, the present invention is directed to a multi-layer composite of two or more polymeric layers at least one of which is formed from a thermosetting composition. The composite comprises a first polymeric layer formed on a substrate and a second polymeric layer over at least a portion of said first polymeric layer, wherein in the absence of the adhesion promoter, the first polymeric layer and the second polymeric layer have poor interlayer adhesion. The inclusion of adhesion-promoting agent in one or both of the first and second polymeric layers in a sufficient amount improves the interlayer adhesion of the first and second polymeric layers.

In a non-limiting embodiment, the first polymeric layer can comprise a primer-surfacer coating and the second polymeric layer can comprise a color-enhancing base coating to which has been subsequently applied a transparent top coat. In another embodiment, the first polymeric layer can comprise an electrodepositable primer coating and the second polymeric layer can comprise a primer-surfacer coating to which has been subsequently applied an appearance enhancing monocoat or a color-plus-clear coating system. In a further embodiment, the first polymeric layer can comprise a transparent clear coat (such as the clear coat in a color-plus-clear coating system) and the second polymeric layer can comprise a repair clear coat or can comprise an adhesive layer such as but not limited to a windshield trim adhesive that is applied to a portion (such as the perimeter) of the clear coat.

The substrate upon which the first polymeric layer has been formed can include a variety of known materials. Non-limiting examples can include a metallic or elastomeric substrate. In an embodiment of the present invention, the first polymeric layer can comprise an electrodepositable primer coating applied to a metallic substrate. In another embodiment, the substrate can comprise a metallic substrate having an electrodepositable primer layer deposited thereon, and optionally a primer-surfacer coating deposited over the electrodepositable primer. In this case, the first polymeric layer can comprise, for example, a pigmented base coat deposited over the electrodeposited primer or the primer-surfacer, and the second polymeric layer can comprise a substantially pigment-free clear coat formed over the pigmented base coat.

In one embodiment of the present invention, the substrate can comprise a metallic substrate. Examples of suitable metallic substrates can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL®, GALVALUME®, and GALVAN® zinc-aluminum alloys coated upon steel, and combinations thereof. Useful non-ferrous metals include aluminum, zinc, magnesium and alloys thereof. Combinations or composites of ferrous and non-ferrous metals can also be used.

In another embodiment of the present invention, the substrate can comprise an elastomeric substrate. Suitable elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), acrylonitrile-butadiene-styrene ("ABS") copolymers, ethylene propylene diene terpolymer ("EPDM") rubber, reaction injected molded polyurethane ("RIM") and thermoplastic polyurethane ("TPU").

When the substrates are used as components to fabricate automotive vehicles (including, but not limited to, automobiles, trucks and tractors) they can have any shape, and can be selected from the metallic and/or flexible substrates described above. Typical shapes of automotive body components can include body side moldings, fenders, bumpers, hoods, and trim for automotive vehicles.

In the absence of the adhesion-promoting agent, the first polymeric layer and said second polymeric layer can have poor interlayer adhesion. That is, in the absence of a boron-containing compound present in either of the first polymeric layer or the second polymeric layer, the two layers have poor interlayer (i.e., intercoat) adhesion. As used herein, by "poor interlayer adhesion" is meant that the second polymeric layer will have delamination or adhesion loss from the first polymeric layer sufficient to be given a rating of 3 or lower, as determined in accordance with ASTM-D 3359-97, method B, using the rating scale specified therein.

In an embodiment of the present invention, an adhesion-promoting agent can be included in one or both of the first polymeric layer and the second polymeric layer in an amount sufficient to improve the interlayer adhesion of the first polymeric layer and the second polymeric layer. The adhesion promoter can be present in the first polymeric layer only, the second polymeric layer only, or, alternatively, in both the first polymeric layer and the second polymeric layer.

In further embodiments, the adhesion promoter, for example, a boron-containing compound, can be present in any of the polymeric layers comprising the substrate over at least a portion of which is formed the first polymeric layer, as well as any of the polymeric layers that can be subsequently formed over at least a portion of the second polymeric layer.

At least one of the first and second polymeric layers is formed from a thermosetting composition.

In one embodiment of the present invention, both the first polymeric layer and the second polymeric layer are formed from a thermosetting composition. In another embodiment, the thermosetting composition comprises a curable coating composition as described below.

As used herein, by "thermosetting composition" is meant one that sets irreversibly upon curing or crosslinking, wherein the polymer chains of the polymeric components are joined together by covalent bonds. This property is usually associated with a cross-linking reaction of the composition constituents often induced by heat or radiation.

In the present invention, thermosetting compositions, for example, curable coating compositions comprise (A) a film-forming polymer comprising reactive functional groups, (B) a curing agent having functional groups reactive with the functional groups of (A), and (C) the adhesion-promoting agent.

In alternate non-limiting embodiments, the adhesion promoter can be present in the composition in an amount sufficient to provide a boron content of at least 0.001 weight percent, or at least 0.025 weight percent, or at least 0.05 weight percent, or at least 0.10 weight percent, based on total weight of the resin solids present in the composition. In further embodiments, the adhesion promoter is present in amounts of 30 weight percent or less, or amounts of less than 25 weight percent, or less than 15 weight percent based on total weight of resin solids.

The film-forming polymer can be selected from polyether polymers, polyester polymers, acrylic polymers, silicon-based polymers, polyepoxide polymers, polyurethane polymers, and combinations thereof.

The film-forming polymer has a reactive functional group that can be selected from hydroxyl, carboxylic acid, isocyanate, blocked isocyanate, primary amine, secondary amine, amide, carbamate, urea, epoxy and compatible mixtures thereof.

By "compatible mixtures thereof" means functional groups that will not react with one another at room temperature. For example, hydroxyl and free isocyanate groups would not be a compatible mixture. However, hydroxyl and carbamate would be a compatible mixture.

Film-forming polymers suitable for use as the reactive functional group-containing film-forming polymer (A) in the present invention can include any of a variety of functional polymers known in the art. Non-limiting examples can include but are not limited to hydroxyl group-containing polymers such as acrylic polyols, polyester polyols, polyurethane polyols, polyether polyols, and mixtures thereof. In an embodiment of the present invention, the film-forming polymer can be an acrylic polyol having a hydroxyl equivalent weight of from 100 to 1000 grams per solid equivalent, or 150 to 500 grams per solid equivalent.

Suitable hydroxyl group and/or carboxyl group-containing acrylic polymers can be prepared using conventional methods known in the art. In an embodiment, these polymers can be prepared from polymerizable ethylenically unsaturated monomers and can be copolymers of (meth)acrylic acid and/or hydroxyalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene. As used herein, "(meth)acrylate" and like terms is intended to include both acrylates and methacrylates.

In a further embodiment of the present invention, the acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid, and an epoxy compound that does not participate in the free radical initiated polymerization with the unsaturated acid monomer. Non-limiting examples of such epoxy compounds can include glycidyl ethers and esters. Suitable glycidyl ethers can include glycidyl ethers of alcohols and phenols such as but not limited to butyl glycidyl ether, octyl glycidyl ether, phenyl glycidyl ether and mixtures thereof. Suitable glycidyl esters can include those that are commercially available from Shell Chemical Company under the tradename CARDURA E; and from Exxon Chemical Company under the tradename GLYDEXX-10. The beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for example, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference.

Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well-known to those skilled in the art, in the presence of suitable catalysts such as organic peroxides or azo compounds, for example, benzoyl peroxide or N,N-azobis(isobutylronitrile). The polymerization can be carried out in an organic solution in which the monomers are soluble by techniques conventional in the art. In other embodiments, these polymers can be prepared by aqueous emulsion or dispersion polymerization techniques that are well known in the art. The ratio of reactants and reaction conditions are selected to result in an acrylic polymer with the desired pendent functionality.

In an embodiment of the present invention, polyester polymer can be used in the coating compositions of the invention as the film-forming polymer. Suitable polyester polymers can include the condensation products of polyhydric alcohols and polycarboxylic acids. Non-limiting examples of polyhydric alcohols can include ethylene glycol, neopentyl glycol, trimethylol propane, pentaerythritol and mixtures thereof. Non-limiting examples of polycarboxylic acids can include adipic acid, 1,4-cyclohexyl dicarboxylic acid, hexahydrophthalic acid and mixtures thereof. In addition to the polycarboxylic acids mentioned above, functional equivalents of the acids such as anhydrides where they exist or lower alkyl esters of the acids such as the methyl esters can be used. Further, small amounts of monocarboxylic acids such as stearic acid can be used. The ratio of reactants and reaction conditions are selected to result in a polyester polymer with the desired pendent functionality, i.e., carboxyl or hydroxyl functionality.

In a non-limiting embodiment, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil, or tung oil.

Carbamate functional polyesters can be prepared using conventional methods known in the art. In an embodiment, these polyesters can be prepared by first forming a hydroxyalkyl carbamate that can be reacted with the polyacids and polyols used in forming the polyester. In alternate embodiments, terminal carbamate functional groups can be incorporated into the polyester by reacting isocyanic acid with a hydroxy functional polyester, or by reacting a hydroxyl polyester with a urea, by a transcarbamoylation reaction. Non-limiting examples of preparations of suitable carbamate functional group-containing polyesters can include those described in U.S. Pat. No. 5,593,733 at column 2, line 40 to column 4, line 9, incorporated herein by reference.

In an embodiment of the present invention, polyurethane polymers containing terminal isocyanate or hydroxyl groups can be used as the polymer (d) in the coating compositions of the present invention. Polyurethane polyols or NCO-terminated polyurethanes can be used. These materials can be prepared by reacting polyols including polymeric polyols with polyisocyanates. Polyureas containing terminal isocyanate or primary and/or secondary amine groups also can be used. These materials can be prepared by reacting polyamines including polymeric polyamines with polyisocyanates. The hydroxyl/isocyanate or amine/isocyanate equivalent ratio can be adjusted and reaction conditions are selected to obtain the desired terminal groups. Non-limiting examples of suitable polyisocyanates can include those described in U.S. Pat. No. 4,046,729 at column 5, line 26 to column 6, line 28, incorporated herein by reference. Non-limiting examples of suitable polyols include those described in U.S. Pat. No. 4,046,729 at column 7, line 52 to column 10, line 35, incorporated herein by reference. Non-limiting examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by various methods known in the art. In an embodiment, polyisocyanate can be reacted with polyester having hydroxyl functionality and containing pendent carbamate groups. In another embodiment, the polyurethane can be prepared by reacting polyisocyanate with polyester polyol and hydroxyalkyl carbamate or isocyanic acid as separate reactants. Non-limiting examples of suitable polyisocyanates can include but are not limited to aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. In an embodiment, cycloaliphatic diisocyanates, such as 1,4-cyclohexyl diisocyanate and isophorone diisocyanate can be employed.

Non-limiting examples of suitable polyether polyols can include polyalkylene ether polyols such as those having the following structural formulas (VII) or (VIII):

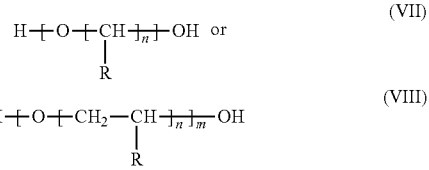

wherein the substituent R is hydrogen or a lower alkyl group containing from 1 to 5 carbon atoms including mixed substituents, and n has a value ranging from 2 to 6, and m has a value ranging from 8 to 100 or higher. In an embodiment, the polyalkylene ether polyol can include poly(oxytetramethylene)glycol, poly(oxytetraethylene)glycol, poly(oxy-1,2-propylene)glycol, poly(oxy-1,2-butylene)glycol and mixtures thereof.

In an embodiment, polyether polyols can be formed from oxyalkylation of various polyols. Non-limiting examples of suitable polyols can include glycols such as ethylene glycol, 1,6-hexanediol, Bisphenol A, and the like, or other higher polyols such as trimethylolpropane, pentaerythritol, and the like. Polyols of higher functionality that can be utilized as indicated can be made by conventional methods known in the art, for instance, by oxyalkylation of compounds such as sucrose or sorbitol. In an embodiment, the oxyalkylation method can include reaction of a polyol with an alkylene oxide, for example, propylene or ethylene oxide, in the presence of an acidic or basic catalyst. Specific examples of polyethers can include those sold under the names TERATHANE and TERACOL, available from E. I. Du Pont de Nemours and Company, Inc.

In alternate embodiments, polymers having reactive functional groups which are useful in the coating compositions of the present invention have a weight average molecular weight (Mw) ranging from 1000 to 20,000, or from 1500 to 15,000, or from 2000 to 12,000 as determined by gel permeation chromatography using a polystyrene standard.

In further embodiments, hydroxyl and/or carbamate functional group-containing polymers can be employed.

In another embodiment, polyepoxides such as those described below with reference to the curing agent (B), can be used.

In alternate embodiments, the polymer having reactive functional groups can be present in the thermosetting compositions in an amount of at least 20 percent by weight, or at least 30 percent by weight, or at least 40 percent by weight based on weight of total resin solids in the coating composition. In further embodiments, the polymer having reactive functional groups can be present in the thermosetting compositions of the present invention in an amount of 80 percent or less by weight, or 70 percent or less by weight, or 60 percent or less by weight based on weight of total resin solids in the coating composition. The amount of the polymer having reactive functional groups present in the thermosetting compositions of the present invention can range between any combinations of these values inclusive of the recited values.

The curing agent for use in the present invention has functional groups reactive with the functional groups of the film-forming polymer.

The curing agent can be selected from a wide variety of known materials in the art. Non-limiting examples can include aminoplast resin, polyisocyanate, blocked isocyanate, polyepoxide, polyacid, anhydride, amine, polyol, and mixtures thereof. In an embodiment, the curing agent can be selected from an aminoplast resin and a polyisocyanate.

Aminoplast resins can serve as curing agents for hydroxyl, carboxylic acid, and carbamate functional group-containing materials and are well known in the art. Aminoplasts can be obtained using various conventional techniques. In an embodiment, the aminoplast can be prepared from the condensation reaction of formaldehyde with an amine or amide. Non-limiting examples of amines or amides can include melamine, urea, or benzoguanamine. In other embodiments, condensates with other amines or amides can be used; for example, aldehyde condensates of glycoluril, which give a high melting crystalline product that can be useful in powder coatings. In alternate embodiments, the aldehyde can be formaldehyde, acetaldehyde, crotonaldehyde, benzaldehyde and mixtures thereof. In a further embodiment, formaldehyde can be used.

In an embodiment, the aminoplast resin can contain methylol groups and in a further embodiment, at least a portion of the methylol groups can be etherified with an alcohol to modify the cure response. Any monohydric alcohol can be employed for this purpose including but not limited to methanol, ethanol, n-butyl alcohol, isobutanol, and hexanol.

Non-limiting examples of suitable aminoplast resins can include those commercially available, for example, from Cytec Industries, Inc. under the trademark CYMEL® and from Solutia, Inc. under the trademark RESIMENE®.

In an embodiment, polyisocyanate can be used as the curing agent. As used herein, the term "polyisocyanate" is intended to include blocked (or capped) isocyanates as well as unblocked (poly)isocyanates. The polyisocyanate can be an aliphatic or an aromatic polyisocyanate, or a mixture thereof. Non-limiting examples can include diisocyanates, higher polyisocyanates such as isocyanurates of diisocyanates, combinations of higher polyisocyanates with diisocyanates, isocyanate prepolymers, for example, reaction products of polyisocyanates with polyols, and mixtures of polyisocyanate curing agents.

In an embodiment, wherein the polyisocyanate is blocked or capped, any suitable aliphatic, cycloaliphatic, or aromatic alkyl monoalcohol known to those skilled in the art can be used as a capping agent for the polyisocyanate. Further non-limiting examples of suitable capping agents can include oximes and lactams.

In an embodiment, curing agents comprising blocked isocyanate compounds such as, for example, the tricarbamoyl triazine compounds described in detail in U.S. Pat. No. 5,084,541 can be used. The tricarbamoyl triazine compound can be used in combination with aminoplast curing agents, and can be used in relatively small amounts compared to the aminoplast, such as but not limited to weight ratios of 15 to 40 aminoplast to 1 tricarbamoyl triazine.

In an embodiment of the present invention, anhydrides can be used as curing agents for hydroxyl functional group-containing materials. Suitable anhydrides can be selected from those known in the art. Non-limiting examples of anhydrides can include those having at least two carboxylic acid anhydride groups per molecule which can be derived from a mixture of monomers comprising an ethylenically unsaturated carboxylic acid anhydride and vinyl co-monomer, such as but not limited to, styrene, alpha-methyl styrene, vinyl toluene, and the like. Non-limiting examples of suitable ethylenically unsaturated carboxylic acid anhydrides can include maleic anhydride, citraconic anhydride, and itaconic anhydride. In another embodiment, the anhydride can be an anhydride adduct of a diene polymer such as maleinized polybutadiene or maleinized copolymer of butadiene, for example, butadiene/styrene copolymer. These and other suitable anhydride curing agents are described in U.S. Pat. No. 4,798,746 at column 10, lines 16-50; and in U.S. Pat. No. 4,732,790 at column 3, lines 41-57.

In an embodiment of the present invention, polyepoxides can be used as curing agents for carboxylic acid functional group-containing materials. Suitable polyepoxides for use are well known in the art. Non-limiting examples can include polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali, or mixtures thereof. These and other suitable polyepoxides are described in U.S. Pat. No. 4,681,811 at column 5, lines 33 to 58.

Suitable curing agents for epoxy functional group-containing materials can include polyacid curing agents, such as the acid group-containing acrylic polymers prepared from an ethylenically unsaturated monomer containing at least one carboxylic acid group and at least one ethylenically unsaturated monomer which is free from carboxylic acid groups. In an embodiment, the acid functional acrylic polymers can have an acid number ranging from 30 to 150. In another embodiment, acid functional group-containing polyesters can be used. The above-described polyacid curing agents are described in further detail in U.S. Pat. No. 4,681,811 at column 6, line 45 to column 9, line 54.

In an embodiment of the present invention, polyols can be used as curing agents for isocyanate functional group-containing materials. The polyols can be selected from materials having two or more hydroxyl groups per molecule, different from component (b) when component (b) is polyol. Non-limiting examples of such materials can include polyalkylene ether polyols, including thio ethers; polyester polyols, including polyhydroxy polyesteramides; and hydroxyl-containing polycaprolactones and hydroxy-containing acrylic copolymers. Further non-limiting examples can include polyether polyols formed from the oxyalkylation of various polyols, for example, glycols such as ethylene glycol, 1,6-hexanediol, Bisphenol A and the like, or higher polyols such as trimethylolpropane, pentaerythritol, and the like; and polyester polyols; and mixtures thereof. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33.

In another embodiment, polyamines can be used as curing agents for isocyanate functional group-containing materials. Non-limiting examples of suitable polyamine curing agents can include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Non-limiting examples of suitable aliphatic and alicyclic diamines can include 1,2-ethylene diamine, 1,2-porphylene diamine, 1,8-octane diamine, isophorone diamine, propane-2,2-cyclohexyl amine, and the like. Non-limiting examples of suitable aromatic diamines can include phenylene diamines and toluene diamines, for example, o-phenylene diamine and p-tolylene diamine. These and other suitable polyamines are described in detail in U.S. Pat. No. 4,046,729 at column 6, line 61 to column 7, line 26.

Various mixtures of curing agents may be used. In an embodiment, the thermosetting compositions can be formulated as a one-component composition where a curing agent such as an aminoplast resin and/or a blocked isocyanate compound such as those described above is admixed with other composition components. The one-component composition can be storage stable as formulated. In alternate embodiments, compositions can be formulated as two-component compositions where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

In alternate embodiments, the curing agent can be present in the coating composition in an amount ranging from 5 to 65, or 10 to 45 percent by weight based on total weight of resin solids in the composition.

The curable compositions of the present invention can be dissolved or dispersed in a diluent such as an organic solvent, water or mixtures thereof. In other embodiments, the compositions can be in solid particulate form, such as, a powder composition, in the form of a dry powder or a powder slurry in water. Non-limiting examples of suitable organic solvents can include alcohols, such as butanol; ketones, such as methyl amyl ketone; aromatic hydrocarbons, such as xylene; and glycol ethers, such as, ethylene glycol monobutyl ether; esters; other solvents; and mixtures thereof.

In diluent-based compositions, the diluent can be present in an amount ranging from 5 to 80 percent by weight based on total weight of the resin solids and diluent, or from 30 to 50 percent by weight. In alternate embodiments, the compositions as described above can have a total solids content ranging from 40 to 100 percent by weight based on total weight of the composition, or from 40 to 75 percent by weight.

In further embodiments, additional components can be present in the compositions. These additional components can include, but are not limited to, catalyst, pigment, fillers, flexibilizers, plasticizers, surface active agents, thixotropic agents, rheology control modifiers, anti-gassing agents, organic cosolvents, flow controllers, hindered amine light stabilizers, anti-oxidants, UV light absorbers, similar additives and mixtures or combinations thereof. In an embodiment, these additional ingredients when present are in an amount up to 40 percent by weight based on the total weight of the composition.

In an embodiment, the present invention is directed to a multi-layer composite coating wherein the first curable coating composition comprises a color-imparting, pigmented base coating composition and the second curable composition comprises a substantially pigment-free clear coating composition.

As used herein, by "substantially pigment-free clear coating composition" is meant a coating composition that forms a transparent coating. Such compositions are sufficiently free of pigment or particles such that the optical properties of the resultant coatings are not seriously compromised. As used herein, "transparent" means that the cured coating has a BYK Haze index of less than 50 as measured using a BYK/Haze Gloss instrument.

The pigment-containing coating compositions can be selected from any of the pigmented compositions used in the coatings industry. In an embodiment, the pigment-containing coating composition can comprise a primer coating composition, such as a pigmented thermosetting weldable primer coating composition, for example, those commercially available under the tradename BONAZINC®, an electrodepositable coating composition such as ED-5000, a primer-surfacer coating composition such as GPX45379, a color-providing base coat such as HWB-9517, and ODCT-6373, all available from PPG Industries, Inc. of Pittsburgh, Pa. Non-limiting examples of pigments that can be used in such base coats can include titanium dioxide, iron oxide, organic pigments and inorganic pigments such as phthalocyanine blue and metallic pigment such as aluminum flake and metal oxide coated micas. Further non-limiting examples of pigmented compositions can include adhesive compositions such as those used as automotive windshield adhesives, for example BETASEAL 15625 available from Essex Specialty Products.

The substantially pigment-free clear curable coating compositions for use in the present invention, can comprise any of the pigment-free coatings known in the art. In an embodiment, the pigment-free coating can include clear coats used in color-plus-clear coating systems for the automotive industry. Non-limiting examples can include TKU1050AR, ODCT-8000, and those available under the tradename DIAMOND COAT® and NCT®, all commercially available from PPG Industries, Inc.

The basecoat compositions can be applied to the substrate by any conventional coating technique such as brushing, spraying, dipping, or flowing. Spray techniques and equipment for air spraying, airless spray, and electrostatic spraying in either manual or automatic methods, as known in the art can be used.

In alternate embodiments, during application of the basecoat to the substrate, the film thickness of the basecoat formed on the substrate can range from 0.1 to 5 mils, or from 0.1 to 1 mils, or it can be 0.4 mils.

After forming a film of the basecoat on the substrate, the basecoat can be cured or alternatively given a drying step in which solvent is driven out of the basecoat film by heating or an air drying period before application of the clearcoat. Suitable drying conditions may depend on the particular basecoat composition, and on the ambient humidity if the composition is water-borne. In an embodiment, a drying time of from 1 to 15 minutes at a temperature of 75° to 200° F. (21° to 93° C.) can be used.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously. In an embodiment, curing conditions can range from 50° F. to 475° F. (10° C. to 246° C.) for 1 to 30 minutes. In a further embodiment, the clearcoating thickness (dry film thickness) can be from 1 to 6 mils.

In an embodiment, the present invention is directed to a method of repairing a multi-layer composite coating comprising a base coat formed on a substrate from a film-forming base coating composition and a first top coat deposited over at least a portion of the base coat, the first top coat formed from a first film-forming top coating composition comprising any of the foregoing coating compositions, the method comprising locating an area of the composite coating which is flawed, and applying a repair top coat film-forming composition to the flawed area after the flawed area has been prepared for repairing. The repair topcoat film-forming composition can comprise a film-forming composition which is the same or different from the first topcoat film-forming composition. The flawed area can be any coating blemish that cannot be polished out, such as but not limited to dirt particles in the coating surface. The flawed area can be abraded or sanded to remove such coating blemishes. In a repair carried out in accordance with the method of the present invention, the first top coating can provide excellent intercoat adhesion with the subsequently applied repair top coating.

The coating compositions of the present invention can provide cured coatings having excellent intercoat or interlayer adhesion to subsequently applied coating layers. In an embodiment, any of the aforementioned substantially pigment-free coating compositions can be applied as a transparent clearcoat in a color-plus-clear coating system as discussed above. In the event of damage to the cured coating system causing a surface defect, it may be necessary to prepare the damaged area for repair with a subsequently applied clear coat composition. The coating compositions of the present invention can provide excellent intercoat adhesion between the first clear coat layer and the subsequently applied repair clear coat layer. When used as a topcoat composition, the coating compositions of the present invention also provide excellent interlayer adhesion between the cured topcoat and a subsequently applied windshield adhesive without the intervening step of applying an adhesion-promoting primer.

Illustrating the invention are the following examples that are not to be considered as limiting the invention to their details. All parts and percentages in the examples, as well as throughout the specification, are by weight unless otherwise indicated.

EXAMPLES

The following Examples show the preparation of various hydroxyl functional polyesters having terminal hydroxyl groups. The polyesters were then reacted with boric acid to form adhesion-promoting agents.

The adhesion-promoting agents were then formulated into thermosetting compositions that were used to prepare multilayer composites in which the interlayer adhesion was evaluated. The polyesters of Examples D through K are in accordance with the present invention. The polyesters of Examples A, B, C and L through O were prepared for comparative purposes. The polyesters of Examples A, B and C contained no or insufficient borate content. The polyesters of Examples L through O contained no or insufficient amount of 1,3-polyol. Examples D through J show the preparation of polyesters from various polycarboxylic acids and polyols with sufficient borate content and sufficient 1,3-polyol content. Example K shows the preparation of a monoester made from a monocarboxylic acid and a 1,3-polyol (3:1 OH/COOH equivalent ratio) with sufficient borate content.

Example A, Comparative

A polyester was prepared from the following ingredients as described below:

| Ingredients | Parts by Weight (grams) |
| --- | --- |
| Adipic acid | 438.0 |
| Trimethylol propane | 792.0 |
| Butyl stannoic acid | 1.20 |
| Triphenyl phosphate | 1.20 |
| Methyl ether of propylene glycol[1] | 500.0 |

[1]DOWANOL PM from Dow Chemical Co.

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 97 grams of distillate was collected and the acid value dropped below 1.5. The material was then cooled to a temperature of 130° C. and methyl ether propylene glycol was added. The final product was a liquid having a non-volatile content of 70% (as measured at 110° C. for one hour), and hydroxyl value of 571 on solid weight, and weight averaged molecular weight of 1548 as measured by gel permeation chromatography.

Example B, Comparative

A borated polyester (B/OH equivalent ratio 0.05:1) was prepared from the following ingredients as described below:

| Ingredients | Parts by Weight (grams) |
| --- | --- |
| Polyester of Example A | 386.5 |
| Boric acid | 2.6 |
| DOWANOL PM | 901.2 |

The resin was prepared in a 2 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 751.9 g of distillate was removed and the reaction cooled to ambient temperature. The resulting liquid resin was 46.7% solids (as measured at 110° C., for one hour).

Example C, Comparative

A borated polyester (B/OH equivalent ratio 0.1:1) was prepared from the following ingredients as described below:

| Ingredients | Parts by Weight (grams) |
| --- | --- |
| Polyester of Example A | 386.2 |
| Boric acid | 5.2 |
| DOWANOL PM | 901.2 |

The resin was prepared in a 2 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 751.9 g of distillate was removed and the reaction cooled to ambient temperature. The resulting liquid resin was 46.7% solids (as measured at 110° C., for one hour).

Example D

A borated polyester (B/OH equivalent ratio 0.3:1) was prepared from the following ingredients as described below:

| Ingredients | Parts by Weight (grams) |
| --- | --- |
| Polyester of Example A | 115.1 |
| Boric acid | 4.6 |
| DOWANOL PM | 207.6 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 225.7 g of distillate was removed and the reaction cooled to ambient temperature. The resulting liquid resin was 45.8% solids (as measured at 110° C., for one hour).

Example E

A borated polyester (B/OH equivalent ratio 0.6:1) was prepared from the following ingredients as described below:

| Ingredients | Parts by Weight (grams) |
| --- | --- |
| Polyester of Example A | 115.4 |
| Boric acid | 270.8 |
| DOWANOL PM | 9.3 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 225.4 g of distillate was removed and the reaction cooled to ambient temperature. The resulting liquid resin was 41.9% solids (as measured at 110° C., for one hour).

Example F

A borated polyester (B/OH equivalent ratio 1:1) was prepared from the following ingredients as described below:

| Ingredients | Parts by Weight (grams) |
| --- | --- |
| Polyester of Example A | 617.9 |
| Boric acid | 82.4 |
| DOWANOL PM | 1441.5 |

The resin was prepared in a 2 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 1240.8 g of distillate was removed and the reaction cooled to ambient temperature. The resulting liquid resin was 48.5% solids (as measured at 110° C., for one hour).

Example G

A polyester was prepared from the following ingredients as described below:

| Ingredients | Parts by Weight (grams) |
| --- | --- |
| EMPOL 1008[1] | 678.6 |
| Adipic acid | 174.7 |
| Trimethylol propane | 631.8 |
| Butyl stannoic acid | 1.41 |
| Triphenyl phosphate | 1.41 |
| Methyl ether of propylene glycol | 598.5 |

[1]Dimerdiacid available from Cognis.

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 77 grams of distillate was collected and the acid value dropped below 1.5. The material was then cooled to a temperature of 130° C. and methyl ether propylene glycol acetate was added. The final product was a liquid having a non-volatile content of 70% (as measured at 110° C. for one hour), and hydroxyl value of 383 on solid weight, and weight averaged molecular weight of 3651 as measured by gel permeation chromatography.

The polyester was reacted with boric acid to form the borated polyester as follows:

| Ingredients | Parts by Weight (grams) |
| --- | --- |
| Polyester of Example G | 276.4 |
| DOWANOL PM | 433.2 |
| Boric acid | 24.7 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 361.4 g of distillate was removed and the reaction cooled to ambient temperature. The resulting liquid resin was 53.5% solids (as measured at 110° C., for one hour).

Example H

A polyester was prepared from the following ingredients as described below:

| Ingredients | Parts by Weight (grams) |
| --- | --- |
| 1,4-cyclohexanediacid | 592.5 |
| Trimethylol propane | 909.5 |
| Butyl stannoic acid | 1.40 |
| Triphenyl phosphate | 1.40 |
| Methyl ether of propylene glycol | 599.6 |

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 92 grams of distillate was collected and the acid value dropped below 1.5. The material was then cooled to a temperature of 130° C. and butyl acetate was added. The final product was a liquid having a non-volatile content of 70% (as measured at 110° C. for one hour), and hydroxyl value of 552 on solid weight, and weight averaged molecular weight of 2363 as measured by gel permeation chromatography.

The polyester was reacted with boric acid to form the borated polyester as follows:

| Ingredients | Parts by Weight (grams) |
| --- | --- |
| Polyester of Example H | 236.1 |
| DOWANOL PM | 541.1 |
| Boric acid | 30.9 |

The resin was prepared in a 2 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 452.9 g of distillate was removed and the reaction cooled to ambient temperature. The resulting liquid resin was 51.8% solids (as measured at 110° C., for one hour).

Example I

A polyester was prepared from the following ingredients as described below:

| Ingredients | Parts by Weight (grams) |
| --- | --- |
| EMPOL 1008 | 1134.1 |
| Trimethylol propane | 528.0 |
| Butyl stannoic acid | 1.6 |
| Triphenyl phosphate | 1.6 |
| Methyl ether of propylene glycol | 682.8 |

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 63 grams of distillate was collected and the acid value dropped below 1.5. The material was then cooled to a temperature of 130° C. and butyl acetate was added. The final product was liquid and had a non-volatile content of 70% (as measured at 110° C. for one hour), and hydroxyl value of 330 on solid weight, and weight averaged molecular weight of 4460 as measured by gel permeation chromatography.

The polyester was reacted with boric acid to form the borated polyester as follows:

| Ingredients | Parts by Weight (grams) |
| --- | --- |
| Polyester of Example I | 506.2 |
| DOWANOL PM | 901.8 |
| Boric acid | 51.5 |

The resin was prepared in a 2 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 601.6 g of distillate was removed and the reaction cooled to ambient temperature. The resulting liquid resin was 54.8% solids (as measured at 110° C., for one hour).

Example J

A polyester was prepared from the following ingredients as described below:

| Ingredients | Parts by Weight (grams) |
| --- | --- |
| Polyester[1] | 203.7 |
| Methyl hexahydrophthalic anhydride | 84.3 |
| Neodecanoic acid glycidyl ester | 123.4 |
| Dimethyl benzyl amine | 1.36 |
| DOWANOL PM | 100 |

[1] A polyester prepared from cyclohexane dicarboxylic acid and pentaerythritol, 1:4.

The resin was prepared in a 1 L flask equipped with a temperature controller, agitator, and reflux condenser. To the reaction flask, was added polyester. The reaction was flushed with $N_2$ and warmed to 60° C. under agitation. Methyl hexahydrophthalic anhydride was added over 30 minutes and the reaction allowed stirring at 60° C. for 1 hour. The resulting reaction was warmed to 90° C. and Neodecanoic acid glycidyl ester was added over 1 hour. Dimethyl benzyl amine was added to the reaction ten minutes after the start of the Neodecanoic acid glycidyl ester addition. After the additions were complete, DOWANOL PM was added. The reaction was agitated at 90° C. for 13 hours and cooled. The resulting resin properties were 78.9% solids, (as measured at 110° C., for one hour) and 8.9 AV.

The polyester was reacted with boric acid to form the borated polyester as follows;

| Ingredients | Parts by Weight (grams) |
| --- | --- |
| Polyester of Example J | 250.6 |
| DOWANOL PM | 310.7 |
| Boric acid | 20.6 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 241.2 g of distillate was removed and the reaction cooled to ambient temperature. The resulting liquid resin was 62.8% solids (as measured at 110° C., for one hour).

Example K

A mono ester-containing material was prepared from the following ingredients as described below.

| Ingredients | Parts by Weight (grams) |
| --- | --- |
| 12-Hydroxy Stearic Acid | 453.3 |
| Trimethylol propane | 206.5 |
| Butyl Stannoic Acid | 0.9 |
| Triphenyl Phosphate | 0.9 |

The resin was prepared in a 2 L flask equipped with a temperature controller, agitator, dean stark trap and reflux condenser. The reactants were added to the reaction flask. The reaction was flushed with $N_2$ and warmed slowly to 200° C. under agitation. The reaction was held at 200° C. for 6 hours during which 24.4 g of water was collected. The reaction was then cooled to ambient temperature and 428 g of DOWANOL PM added. The resulting resin properties were 55.6% solids (as measured at 110° C., for one hour), Gardner bubble viscosity-A and AV-2 meq/KOHg.

The monoester was reacted with boric acid to form the borated ester as follows:

| Ingredients | Parts by Weight (grams) |
| --- | --- |
| Polyester of Example K | 502.3 |
| DOWANOL PM | 405.6 |
| Boric acid | 38.6 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 451.1 g of distillate was removed and the reaction cooled to ambient temperature. The resulting liquid resin was 61.6% solids (as measured at 110° C., for one hour).

Example L, Comparative

A polyester was prepared from the following ingredients as described below:

| Ingredients | Parts by Weight (grams) |
| --- | --- |
| Trimethylol propane | 266 |
| Neopentyl glycol | 594 |
| Trimethylpentanediol | 351 |
| Hexahydrophthalic anhydride | 1232 |

The trimethylol propane, neopentyl glycol, 2,2,4-trimethyl1,3-pentane diol, hexahydrophthalic anhydride, 8.8 grams of butyl stannoic acid and 5.4 grams of triphenyl phosphite were added to a suitable reaction vessel equipped with a stirrer, temperature probe, a steam heated reflux condenser with a distillation head and a nitrogen sparge. The contents of the flask were heated to 90° C. The contents then underwent an exotherm to 150° C. The reaction was then heated to 200° C. At this time water began to be evolved from the reaction. The temperature of the reaction mixture was raised to 210° C. and held at that temperature until 146 grams of water had been distilled and the acid value of the reaction mixture was found to be 10. The contents of the reactor were cooled and poured out. The final material had a measured solids of 97% and a hydroxyl value of 139. This resin was then thinned to 69% solids with a 50:50 blend of Dowanol PM acetate (monomethylether of propylene glycol acetate from Dow Chemical Co.) and Dowanol PM (monomethylether of propylene glycol from Dow Chemical Co.).

Example M, Comparative

A borated polyester was prepared from the following ingredients as described below:

| Ingredients | Parts by Weight (grams) |
| --- | --- |
| Polyester of Example L | 819.2 |
| Boric acid | 30.9 |
| DOWANOL PM | 675.8 |

The resin was prepared in a 2 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 452.2 g of distillate was removed and the reaction cooled to ambient temperature. The resulting liquid resin was 55.1% solids (as measured at 110° C., for one hour).

Example N, Comparative

A polyester was prepared from the following ingredients as described below:

| Ingredients | Parts by Weight (grams) |
| --- | --- |
| PRIPOL 1013[1] | 567 |
| 1,6-hexanediol | 236 |
| Butyl stannoic acid | 0.8 |
| Triphenyl phosphite | 0.8 |
| Methyl ether of propylene glycol | 331.5 |

[1]Dimerdiacid available from Unichema.

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 29 grams of distillate was collected and the acid value dropped below 1.5. The material was then cooled to a temperature of 130° C. and butyl acetate was added. The final product was liquid and had a non-volatile content of 63.9% (as measured at 110° C. for one hour), and hydroxyl value of 144.9 on solid weight, and weight averaged molecular weight of 3668 as measured by gel permeation chromatography.

The polyester of Example N was borated as follows:

| Ingredients | Parts by Weight (grams) |
| --- | --- |
| Polyester of Example N | 227 |
| DOWANOL PM | 451.1 |
| Boric acid | 20.6 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 301.2 g of distillate was removed and the reaction cooled to ambient temperature. The resulting liquid resin was 43.4% solids (as measured at 110° C., for one hour).

Example O, Comparative

A polyester was prepared from the following ingredients as described below:

| Ingredients | Parts by Weight (grams) |
| --- | --- |
| Adipic acid | 284.6 |
| 1,6-hexanediol | 460 |
| Butyl stannoic acid | 1.56 |
| Triphenyl phosphite | 1.56 |
| Methyl ether of propylene glycol | 294.5 |

The polyester polymer was prepared in a four-neck round bottom flask equipped with a thermometer, mechanical stirrer, condenser, dry nitrogen sparge and a heating mantle. The first four ingredients were heated to a temperature of 200° C. and stirred in the flask until about 51 grams of distillate was collected and the acid value dropped below 1.5. The material was then cooled to a temperature of 130° C. and butyl acetate was added. The final product was liquid and had a non-volatile content of 57.3% (as measured at 110° C. for one hour), and hydroxyl value of 163 on solid weight The polyester of Example O was borated as follows:

| Ingredients | Parts by Weight (grams) |
|---|---|
| Polyester of Example O | 334.4 |
| DOWANOL PM | 270.8 |
| Boric acid | 12.4 |

The resin was prepared in a 1 L flask equipped with a dean stark trap, temperature controller, agitator, and reflux condenser. The ingredients were combined in the reactor, and flushed with $N_2$. The mixture was warmed to reflux under agitation and remained at reflux for one hour. Then 181.3 g of distillate was removed and the reaction cooled to ambient temperature. The resulting liquid resin was 45.4% solids (as measured at 110° C., for one hour).

Examples 1-4

Examples 1-4 are of formulated clear coating compositions. Examples 2, 3 and 4 contained various amounts of the adhesion-promoting agents of the present invention. Example 1 was a control with no adhesion-promoting agent. The coating compositions were formulated by first forming a pre-mixture and then adding the adhesion-promoting agents as shown in Table 1 below.

The Pre-mixture was prepared by mixing the following components sequentially with mild agitation:

Pre-Mixture A

| Ingredient | Parts by weight (grams) | Solid weights (grams) |
|---|---|---|
| Xylene | 1.7 | — |
| Ethyl-3-Ethoxypropanoate | 1.5 | — |
| Aromatic Solvent - 150 Type | 3.7 | — |
| Butyl Cellosolve ® acetate[1] | 2.40 | — |
| Butyl Carbitol ®[2] | 1.20 | — |
| Butyl Carbitol ® acetate[3] | 1.50 | — |
| Tridecyl Alcohol | 1.50 | — |
| Aromatic Solvent - 100 Type | 3.05 | — |
| TINUVIN ® 1130[4] | 0.40 | 0.40 |
| TINUVIN 292[5] | 0.30 | 0.30 |
| Acid catalyst[6] | 0.50 | 0.35 |
| Cymel 202[7] | 9.60 | 7.7 |
| LAROTACT LR 9018[8] | 4.60 | 2.3 |
| Sag Control agent[9] | 25 | 14 |
| Acrylic[10] | 16.10 | 11.4 |
| Setamine US 146[11] | 10.60 | 7.6 |
| Byk 390[12] | 0.20 | 0.03 |
| Byk 337[13] | 0.04 | 0.02 |
| Reduction Information: | | |
| Aromatic Solvent - 100 Type[15] | 30 | |
| Spray viscosity[14] (sec) | 28 | |
| Paint temperature (° F.) | 72 | |

[1]2-Butoxyethyl acetate solvent is commercially available from Union Carbide Corp.
[2]Diethylene glycol monobutyl ether available from Union Carbide Corp.
[3]2-(2-Butoxyethoxy) ethyl acetate is commercially available from Union Carbide Corp.
[4]UV absorber available from Ciba Specialty Chemicals Corp.
[5]Sterically hindered amine light stabilizer commercially available from Ciba Additives.
[6]Dodecyl benzene sulfonic acid solution available from Chemcentral.
[7]Melamine formaldehyde resin commercially available from Cytec Industries.
[8]Tris (alkyl carbamoyl) triazine available from BASF AG.
[9]SCA acrylic resin solution from PPG.
[10]Acrylic resin solution from PPG.

| Ingredient | Parts by weight (grams) | Solid weights (grams) |
|---|---|---|

[11]Melamine formaldehyde resin commercially available from Nuplex Resins.
[12]Polyacrylic copolymer solution from Byk Chemie.
[13]Polyether modified polydimethylsiloxane solution from Byk Chemie.
[14]Viscosity measured in seconds with a #4 FORD efflux cup at ambient temperature.
[15]Sufficient solvent added to achieve the desired spray viscosity.

TABLE 1

| Ingredient | Example 1 (Comparative) | Example 2 | Example 3 | Example 4 |
|---|---|---|---|---|
| Control | 83.9 (44.1) | 83.9 (44.1) | 83.9 (44.1) | 83.9 (44.1) |
| Acrylic resin[1] | 14.2 (9.2) | 9.4 (6.1) | 4.8 (3.1) | — |
| Resin Example A TMP/Adipic/borate | — | 6.4 (3.1) | 12.6 (6.1) | 19.0 (9.2) |

[1]A polymer comprising Cardura E, styrene, hydroxyethyl methacrylate, 2-ethylhexyl acrylate, acrylic acid at an Mw of about 8000 having a hydroxyl EW on solids of 370. Polymer is 65% by weight solids in Xylene/Solvesso 100 (available from Exxon) at a weight ratio of 34/66.

The amount without parenthesis is total weight. The amount within parenthesis is solids weight.

Examples 5-18 are also formulated clear coating compositions. Examples 10-18 are of the invention in which various adhesion-promoting agents of the invention in various amounts are included in the compositions. Examples 5-9 are for comparative purposes in which various additives not within the scope of the invention are included within the formulation. In Example 5, a carbamoylated acrylic resin was the additive; Example 6 used a polyester that was not borated. Example 7 used a borated version of the polyester of Example 6, but in which the 1,3-polyol content was below that required by the invention. Examples 8 and 9 used borated polyesters that did not contain a 1,3-polyol.

The coating compositions were formulated by first forming a pre-mixture as shown below as Pre-mixture B and then adding the adhesion promoting agent as shown in Table 2 below. In each case, the adhesion promoting agent was added to about 160 parts by weight (88.4 solids) of the pre-mixture.

Pre-Mixture B

| Ingredient | Parts by weight (grams) | Solid weights (grams) |
|---|---|---|
| Diisobutyl ketone | 17.32 | — |
| DOWANOL DPM[1] | 2.68 | — |
| Aromatic Solvent - 100 Type | 6.1 | — |
| DOWANOL PM Acetate[2] | 11.3 | — |
| TINUVIN 900[3] | 1.12 | 1.12 |
| TINUVIN ® 328[4] | 1.55 | 1.55 |
| Acrylic Rheology Control Agent[5] | 6.18 | 1.85 |
| Anti-sag Solution[6] | 6.53 | 2.60 |
| RESIMENE 757[7] | 41.5 | 40.27 |
| Isobutyl alcohol | 2.58 | — |
| Carbamoylated polyester[8] | 54.4 | 39.4 |
| TINUVIN 292[9] | 0.33 | 0.33 |
| Acid catalyst[10] | 1.24 | 0.87 |
| Polybutyl acrylate[11] | 0.33 | 0.20 |

-continued

| Ingredient | Parts by weight (grams) | Solid weights (grams) |
|---|---|---|
| DISPARLON OX-60[12] | 0.37 | 0.19 |
| Reduction Information: | | |
| Diisobutyl Ketone | 6.5 | |
| Spray viscosity[13] (sec) | 30 | |
| Paint temperature (° F.) | 75 | |

[1]Dipropylene glycol monomethyl ether, available from Dow Chemical Co.
[2]Methyl ether propylene glycol acetate, available from Dow Chemical Co.
[3]Benzotriazole derivative available from CIBA Additives.
[4]2-(2'-Hydroxy-3',5'-ditert-amylphenyl) benzotriazole UV light stabilizer available from Ciba Additives.
[5]A crosslinked polymeric dispersion comprising ethylene glycol dimethacrylate, styrene, butyl acrylate, and methyl methacrylate. The dispersion is 31% by weight in oxo-hexyl acetate (available from Exxon Chemicals). The number average particle size is 1000 angstroms.
[6]A dispersion containing AEROSIL R812 S silica (available from Degussa), and a polymeric component which comprises hydroxy propyl acrylate, styrene, butyl methacrylate, butyl methacrylate acrylic acid at an Mw of 7000 having a hydroxy EW on solids of 325. Polymer is 67.5% by weight solids in methyl ether of propylene glycol monoacetate/SOLVESSO 100 (available from Exxon) at a weight ratio of 60/40.
[7]Melamine formaldehyde resin commercially available from Solutia Inc.
[8]Carbamate functional polyester resin solution (composition described in U.S. Pat. No. 6,592,999.
[9]Sterically hindered amine light stabilizer commercially available from Ciba Additives.
[10]Dodecyl benzene sulfonic acid solution available from Chemcentral.
[11]A flow control agent having a Mw of about 6700 and a Mn of about 2600 made in xylene at 62.5% solids available from DuPont.
[12]Additive available from King Industries.
[13]Viscosity measured in seconds with a #4 FORD efflux cup at ambient temperature.

with the invention, in which the borated adipic acid-trimethylolpropane polyesters contained sufficient borate levels to positively affect adhesion.

TABLE 5

| | Example No. | | | | | |
|---|---|---|---|---|---|---|
| Additive | 19 | 20 | 21 | 22 | 23 | 24 |
| A | 23.8 (15.3) | | | | | |
| B | | 32.4 (15.3) | | | | |
| C | | | 34.7 (15.3) | | | |
| D | | | | 33.3 (15.3) | | |
| E | | | | | 36.5 (15.3) | |
| F | | | | | | 31.5 (15.3) |

The film forming compositions of Examples 1-24 were spray applied to a pigmented basecoat to form color-plus-clear composite coatings over primed electrocoated steel panels. The panels used were cold rolled steel panels (size 4 inches×12 inches (10.16 cm by 30.48 cm)). Panels for Examples 1 through 4 were coated with ED6060 electrocoat

TABLE 2

| Example No. | 5 | 6 | 7 | 8 | 9 | 10 | 11 | 12 | 13 | 14 | 15 | 16 | 17 | 18 |
|---|---|---|---|---|---|---|---|---|---|---|---|---|---|---|
| Carbamoylated acrylic[1] | 24.7 (15.3) | | | | | | | | | | | | | |
| L | | 22.1 (15.3) | | | | | | | | | | | | |
| M | | | 27.7 (15.3) | | | | | | | | | | | |
| N | | | | 35.2 (15.3) | | | | | | | | | | |
| O | | | | | 33.6 (15.3) | | | | | | | | | |
| A | | | | | | 23.8 (15.3) | | | | | | | | |
| F | | | | | | | 10.3 (5) | 20.6 (10) | 31.5 (15) | | | | | |
| I | | | | | | | | | | 27.8 (15.3) | | | | |
| H | | | | | | | | | | | 29.5 (15.3) | | | |
| J | | | | | | | | | | | | 24.2 (15.3) | | |
| G | | | | | | | | | | | | | 28.6 (15.3) | |
| K | | | | | | | | | | | | | | 25 (15.3) |

[1]Carbamate functional acrylic resin solution as described in U.S. Pat. No. 6,592,999.

Examples 19-24

Examples 19-24 show the effect of increasing borate content in the ester-borate adhesion-promoting agents. For all the Examples, coating compositions were formulated by adding the adhesion-promoting agents to Pre-mixture B as shown in Table 5 below. In each case, the adhesion promoting agent was added to about 160 parts by weight (88.4 solids) of the pre-mixture.

Example 19 was the control that used an adipic acid-trimethylolpropane polyester with no borate. Examples 20 and 21 were comparative examples that contained borated adipic acid-trimethylolpropane polyesters with insufficient borate levels. Examples 22, 23 and 24 were examples in accordance and 1177225A primer, both available from PPG Industries, Inc. For Examples 5 through 24, panels were coated with ED6230B electrocoat and FCP6519 primer, both available from PPG Industries, Inc.

Examples 1 through 4 used Reflex Silver, a silver-pigmented water-borne basecoat, available from PPG Industries, Inc. A black-pigmented solvent-based acrylic/melamine basecoat, DCT6373, available from PPG Industries, Inc. was used for examples 5-24.

Basecoats were automated spray applied to the electrocoated and primed steel panels at ambient temperature (about 70° F. (21° C.)). A dry film thickness of about 0.6 to 0.8 mils (about 15 to 20 micrometers) was targeted for the basecoats. The water-borne basecoat panels were dehydrated for 10 minutes @ 176° F. (80° C.) prior to clearcoat application. The solvent-borne basecoat panels were only given an air flash at ambient temperature for one to five minutes.

The clear coating compositions were each automated spray applied to a basecoated panel at ambient temperature in two coats with an ambient flash between applications. Clearcoats were targeted for a 1.6 to 1.8 mils (about 41 to 46 micrometers) dry film thickness. All coatings were allowed to air flash at ambient temperature before the oven. Panels were baked for thirty minutes at 285° F. (141° C.) to fully cure the coating(s). The panels were baked in a horizontal position. To test for recoat adhesion, an original basecoated and clearcoated panel, as described above, was given another layer of basecoat and clearcoat or clearcoat only. Half of an original panel from each clear coating was basecoated and clearcoated and the other half of the panel was clearcoated only. To recoat the panels (1-4) half and half, the bottom halves of the originals were covered with aluminum foil and then the Reflex Silver basecoat were automated spray applied as described above. The foil was removed, resulting in an original panel with the upper half coated in basecoat and the bottom half still with only the original coatings layers. The respective clearcoat was then automated spray applied to the entire panel as described above. The resulting panels were half coated in basecoat/clearcoat from the original spray application and another layer of basecoat/clearcoat from the recoat spray applications (B/C//B/C). The other half of the resulting panel was coated in basecoat/clearcoat from the original spray application and another layer of clearcoat from the recoat spray application (B/C//C). Properties for the coatings are reported below in Tables 3, 4 and 6.

TABLE 3

| Example No. | Boron/OH Equivalent Ratio | Equivalent Ratio of 1,3-Polyol to Acid | Initial 20° Gloss[1] | DOI[2] | Recoat Adhesion[3] B/C//B/C | Recoat Adhesion[3] B/C//C |
|---|---|---|---|---|---|---|
| 1 (Comparative) | — | — | 97 | 73 | 5 | 1 |
| 2 | 1.0 | 3:1 | 98 | 75 | 5 | 5 |
| 3 | 1.0 | 3:1 | 98 | 77 | 5 | 5 |
| 4 | 1.0 | 3:1 | 98 | 74 | 5 | 5 |

TABLE 4

| Example No. | Boron/OH Equivalent Ratio | Equivalent Ratio of 1,3-Polyol to Acid | Initial 20° Gloss[1] | DOI[2] | Quick Knife Adhesion[4] (% Cohesive Failure) |
|---|---|---|---|---|---|
| 5 (Comparative) | — | — | 88 | 97 | 0 |
| 6 (Comparative) | 0 | 0.75:1 | 88 | 97 | 0 |
| 7 (Comparative) | 1.0 | 0.75:1 | 89 | 96 | 0 |
| 8 (Comparative) | 1.0 | 0 | 80 | 90 | 40 |
| 9 (Comparative) | 1.0 | 0 | 88 | 95 | 0 |
| 10 (Comparative) | 0 | 3:1 | 88 | 95 | 0 |
| 11 | 1.0 | 3:1 | 88 | 92 | 100 |
| 12 | 1.0 | 3:1 | 88 | 97 | 100 |
| 13 | 1.0 | 3:1 | 86 | 93 | 100 |
| 14 | 1.25 | 3:1 | 82 | 96 | 100 |
| 15 | 1.0 | 3:1 | 87 | 94 | 100 |
| 16 | 1.25 | 4:1 | 88 | 97 | 100 |
| 17 | 1.0 | 3:1 | 88 | 97 | 100 |
| 18 | 1.25 | 3:1 | 78 | 50 | 100 |

TABLE 6

| Example No. | Boron/OH Equivalent Ratio | Equivalent Ratio of 1,3-Polyol to Acid | Initial 20° Gloss[1] | DOI[2] | Quick Knife Adhesion[4] (% Cohesive Failure) |
|---|---|---|---|---|---|
| 19 (Comparative) | 0 | 3:1 | 88 | 95 | 0 |
| 20 (Comparative) | 0.05 | 3:1 | 90 | 94 | 0 |
| 21 (Comparative) | 0.10 | 3:1 | 91 | 91 | 0 |
| 22 | 0.30 | 3:1 | 89 | 95 | 100 |
| 23 | 0.60 | 3:1 | 89 | 95 | 100 |
| 24 | 1.0 | 3:1 | 86 | 93 | 100 |

[1]20° gloss was measured with a Statistical Novo-Gloss 20° gloss meter, available from Paul N. Gardner Company, Inc.
[2]Distinctness-of-image (DOI) measurement was measured with a Hunter Associates Dorigon II ™ DOI meter.
[3]Recoat Adhesion Testing description (Cross hatch Adhesion) - refer to test description in U.S. Pat. No. 6,592,999 located under Table 3, footnote 2.
[4]Quick Knife Testing was performed as follows: In order to test for windshield adhesion, a bead of windshield adhesive is applied to the clear coat surface within 1-4 hours following the final bake (30 minutes at 285° F.). The Betaseal urethane moisture cure windshield adhesive 15625 obtained from Dow Automotive was used. Approximately a 5 mm × 5 mm × 250 mm adhesive bead is placed on the cured color plus clear substrate. The adhesive is cured for 72 hours at room temperature (~75° F.) and 20-50% relative humidity. After 72 hours, the cured adhesive bead is cut with a razor blade. A cut is made through the adhesive bead at a 60° angle at 12 mm intervals while pulling back the edge of the adhesive at a 180° angle. A minimum of 10 cuts is done for each system. The desired result is described as 90-100% cohesive failure (CF). Cohesive failure (CF) occurs when the integrity of the adhesive bead is lost as a result of cutting and pulling. When adhesion loss occurs between the adhesive bead and clearcoat surface, the cohesive failure rating is 0%.

The results summarized in Table 3 show that the adhesion-promoting agent of the invention (Examples 2, 3 and 4) at various levels (5.8-17.3% by weight solids) provide superior recoat adhesion without adversely affecting appearance compared to the control which did not contain the adhesion promoting agent.

The results summarized in Table 4 show that the various additives of the invention (Examples 11-18) provide superior adhesion to the comparative examples (5-10) that contained additives outside the scope of the invention. In Examples 11-17, appearance was not adversely affected. However, in Example 18, appearance was adversely affected.

The results summarized in Table 6 show that the boron to hydroxy equivalent ratio in the borated polyester should be greater than 0.10.

Whereas particular embodiments of this invention have been described above for purposes of illustration, it will be evident to those skilled in the art that numerous variations of the details of the present invention may be made without departing from the invention as defined in the appended claims.

The invention claimed is:

1. A thermosetting composition comprising:
   (a) a film-forming polymer having reactive functional groups,
   (b) a curing agent having functional groups reactive with the functional groups of (a),
   (c) an adhesion-promoting agent derived from:
      (i) boric acid or an equivalent thereof, and
      (ii) an ester having two or more terminal hydroxyl groups that are derived at least in part from a 1,3-polyol;

the equivalent ratio of boric acid or equivalent thereof to hydroxyl being greater than 0.1:1 and the equivalent ratio of 1,3-polyol to acid being greater than 2:1.

2. The composition of claim 1 in which the functional groups of the film-forming polymer are selected from hydroxyl, primary amino, secondary amino, carboxylic acid, epoxy, carbamate, amide, urea and compatible mixtures thereof.

3. The composition of claim 2 in which the functional groups are selected from hydroxyl, carbamate and compatible mixtures thereof.

4. The composition of claim 3 in which the curing agent is selected from isocyanate including blocked isocyanate and aminoplast.

5. The composition of claim 2 in which the functional group of the curing agent is selected from isocyanate including blocked isocyanate, methylol including methylol ether, epoxy, carboxylic acid, anhydride and compatible mixtures thereof.

6. The composition of claim 1 in which (a) is selected from boric acid, boric acid ester, metal borate and mixtures thereof.

7. The composition of claim 6 in which (i) is a boric acid ester having from 1 to 6 carbon atoms in the ester group.

8. The composition of claim 7 in which the borate ester is selected from trimethyl borate, triisopropyl borate, and triphenyl borate.

9. The composition of claim 1 in which (c) is present in the composition in amounts sufficient to give a boron content of 0.001 to 5 percent by weight based on total weight of resin solids present in the curable composition.

10. The composition of claim 1 in which (i) and (ii) are present in the curable composition as a reaction product.

11. The composition of claim 1 in which the ester is a polyester.

12. The composition of claim 11 in which the polyester is formed from reacting a polycarboxylic acid or equivalent thereof with the 1,3-polyol.

13. The composition of claim 1 in which the 1,3-polyol is selected from trimethylolpropane and pentaerythritol.

14. In a multilayer composite of two or more polymeric layers at least one of which is formed from a thermosetting composition, the composite comprising a first polymeric layer formed on a substrate, and a second polymeric layer formed over at least a portion of the first polymeric layer, the improvement comprising the inclusion in one or both of the polymeric layers in an amount sufficient to improve the interlayer adhesion between the first and second polymeric layers and wherein the adhesion-promoting agent is derived from:
 (i) boric acid or an equivalent thereof,
 (ii) an ester having two or more terminal hydroxyl groups that are derived at least in part from a 1,3-polyol;
the equivalent ratio of boric acid or equivalent thereof to hydroxyl being greater than 0.1:1 and the equivalent ratio of 1,3-polyol to acid being greater than 2:1.

15. The composite of claim 14, wherein one or both of said first polymeric layer and said second polymeric layer comprises a cured layer formed from a thermosetting composition comprising:
 (a) a film-forming polymer having reactive functional groups;
 (b) a curing agent having functional groups reactive with the functional groups of (a).

16. The composite of claim 15, wherein the film-forming polymer (a) comprises at least one polymer selected from an acrylic polymer, a polyester polymer, a polyurethane polymer, and mixtures thereof.

17. The composite of claim 15, wherein the film-forming polymer (a) comprises functional groups selected from hydroxyl, carboxylic acid, primary amine, secondary amine, amide, carbamate, urea, epoxy, and compatible mixtures thereof.

18. The composite of claim 17, wherein the film-forming polymer comprises functional groups selected from hydroxyl groups, carbamate groups, and mixtures thereof.

19. The composite of claim 15, wherein the curing agent (b) comprises aminoplast resins, polyisocyanates, blocked polyisocyanates, polycarboxylic acids, polyepoxides, and compatible mixtures thereof.

20. The composite of claim 19, wherein the curing agent (b) comprises at least one aminoplast resin and at least one blocked isocyanate compound comprising a tricarbamoyl triazine compound.

21. The composite of claim 14 in which (i) is selected from boric acid, boric acid ester, metal borate, and mixtures thereof.

22. The composite of claim 14 in which (i) is a boric acid ester having from 1-6 carbon atoms in the ester group.

23. The composite of claim 14 in which (i) and (ii) are present as a reaction product.

24. The composite of claim 14 in which (i) and (ii) are present in an amount sufficient to provide a boron content of 0.001 to 5 percent by weight based on weight of resin solids in the composite.

25. The composite of claim 14 comprising a pigment-containing polymeric layer deposited on a metallic or elastomeric substrate, a substantially pigment-free clear polymeric layer deposited on the pigment-containing polymeric layer, and an adhesive layer deposited on the clear polymeric layer, the clear polymeric layer being the first polymeric layer and the adhesive layer being the second polymeric layer.

26. The composite of claim 25 in which the adhesion-promoting agent is present in the clear polymeric layer.

27. The composite of claim 14 comprising a first clear substantially pigment-free polymeric layer deposited on a pigment-containing polymeric layer, and a second clear substantially pigment-free polymeric layer deposited on the first clear polymeric layer.

28. The composite of claim 27 in which the adhesion-promoting agent is present in the first clear polymeric layer.

29. The composite of claim 14 in which the ester is a polyester.

30. The composite of claim 29 in which the polyester is formed from reacting a polycarboxylic acid or equivalent thereof with the 1,3-polyol.

31. The composite of claim 14 in which the 1,3-polyol is selected from trimethylolpropane and pentaerythritol.

* * * * *